Figure 1:
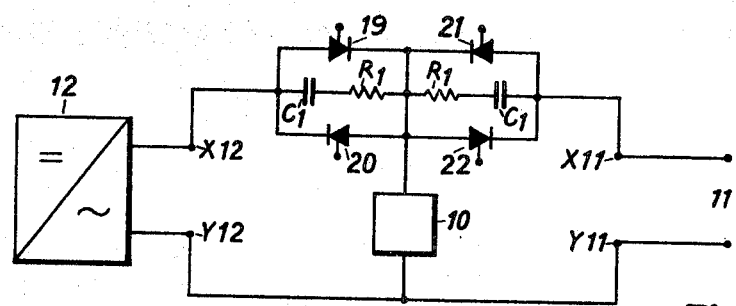

United States Patent [19]
Wolpert

[11] 3,761,733
[45] Sept. 25, 1973

[54] ARRANGEMENT FOR UNINTERRUPTABLE POWER SUPPLY TO A LOAD FROM TWO OR MORE A.C. POWER SOURCES

[75] Inventor: Tadeusz Wolpert, Vendelso, Sweden

[73] Assignee: Telefonaktiebolaget LM Ericsson, Stockholm, Sweden

[22] Filed: Aug. 25, 1972

[21] Appl. No.: 283,754

[30] Foreign Application Priority Data
Sept. 7, 1971 Sweden.......................... 11316/71

[52] U.S. Cl. ................................................ 307/64
[51] Int. Cl. ............................................. H02j 9/00
[58] Field of Search .................. 307/64, 66, 85, 86, 307/87, 43, 112, 116, 125, 126, 127, 128

[56] References Cited
UNITED STATES PATENTS
3,662,182  5/1972  Ullmann et al. ..................... 307/64

Primary Examiner—Herman J. Hohauser
Attorney—Hane, Baxley & Spiecens

[57] ABSTRACT

The present invention relates to an arrangement for uninterruptable power supply to a load, for example a data processing equipment. To the load at least two A.C. power supplies are connected each via a pair of antiparallel connected controlled rectifiers, for example thyristors. One rectifier in each pair is brought to its conductive state simultaneously as the corresponding rectifier in all the other pairs and remains in this state as long as the voltage across and the current through the load have the same polarity during one half-period. During the next half-period the other rectifier in all the pairs is brought to its conductive state. Upon failure in one of the power supplies, for example the mains, both the rectifiers in the pair connected to this supply will become blocked and power to the load will be delivered from the other power supply or supplies via the other controlled rectifier pairs.

9 Claims, 10 Drawing Figures

ARRANGEMENT FOR UNINTERRUPTABLE POWER SUPPLY TO A LOAD FROM TWO OR MORE A.C. POWER SOURCES

Alternating-current supply without interruption is more and more required within telecommunication, industry and so on. A typical example of arrangements which demand power without interruption is data processing equipments. Voltage interruptions can even if the duration is a fraction of a period, cause grave and permanent disturbances by influencing storage devices and the like.

The general alternating-current mains is in such cases unsuitable as feeding source. A considerably more reliable way of feeding is obtained by using a static inverter fed from a D.C. system consisting of rectifier and battery. The alternating-current mains is used in this case as a stand-by for the inverter. Upon failure in the inverter, transfer of the load from the inverter to the mains is carried out by a suitable, automatically operating arrangement. In the arrangements now existing this transfer is, however, not solved in a satisfactory manner.

The output voltage of the inverter can certainly without difficulty be synchronized to the voltage of the mains and thus direct parallel working can be applied. At this operation, however, the transient free output voltage of the inverter is lost. In short-circuiting or other disturbance in the mains the common output voltage will drop or be influenced in other manner.

The method, which presently is applied in most cases, is based on a rapid changing-over from an inverter to the mains upon a failure in the inverter. The necessary switch automatic includes a supervising apparatus (voltage mechanical relay) and a switch. During the switching itself, however, under all circumstances a transient voltage interruption is obtained. Electromechanical change-over switches achieve voltage interruptions which durate for some periods. By using rapid supervision apparatus and electronic switches with thyristors the switching time can be reduced to a fraction of a period, however, it will never be eliminated completely. The operation time of the sensing apparatus is dependent on during which part of the period the voltage reduction has occurred. The functional value of the sensing apparatus, however, has to be chosen with a certain margin from the nominal value e.g., 20 percent under nominal voltage, so that the switching occurs at first when the voltage of the voltage source at present feeding, has dropped to or under this value.

Another drawback with the above described operation method is the following. In many cases the load demands great starting currents for example by the starting of motors or by the connecting of transformers. The inverter is normally provided with current limiting means in order to prevent over-loading. When feeding from the inverter the start current may not exceed the nominal current. If that occurs the feeding voltage breaks down. Inverters, consequently, have to be over-dimensioned.

The present invention has for its object an arrangement by means of which a completely uninterruptable alternating-voltage for feeding a load is achieved and where transfer of the load current between different current sources occurs continuously and automatically without the output voltage being influenced. The only variation in the output voltage which can arise, consists in the difference in the voltage levels of the different sources and in their internal voltage drops respectively.

The different current sources operate continuously in parallel, but in such a manner that a disturbance in a current source neither influences other current sources nor the voltage which is impressed across the load.

The invention relates thus to an arrangement for power supply to a load from two or more A.C. power sources which give output voltages of mutually equal frequency and mainly of equal phase.

The invention is characterized thereby that each current source is connected to the load via two controlled rectifiers connected in parallel with each other in the form of thyristors, thyratrons or the like which with unlike poles are connected to the one pole of the current source and with opposite, unlike poles to the load, to the control electrodes of which control impulses are adapted to be applied which control impulses have a repetition frequency which is equal to the frequency of the output voltage of the alternating voltage source, and which control pulses have such a polarity that they bring the controlled valve in conducting condition, the conducting direction of said rectifier being such that during the half-periods of the output voltage of the alternating current sources, when the control pulses are applied, it can conduct current from the alternating current source to the load, but keeps the other rectifier in non-conducting condition.

Figure 2:
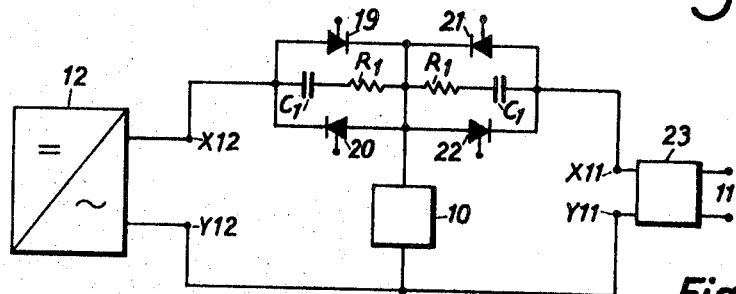
Figure 3:
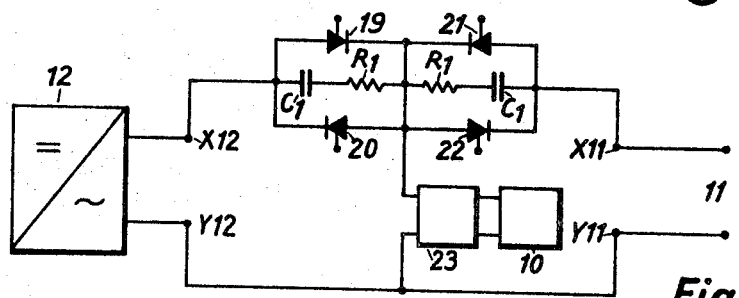
Figure 4:
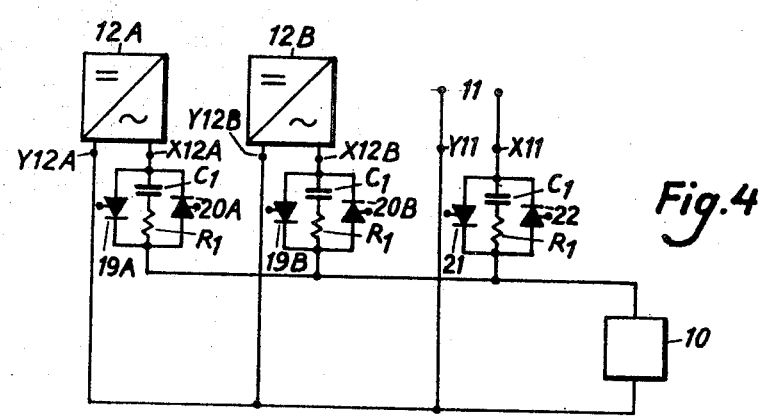
Figure 5:
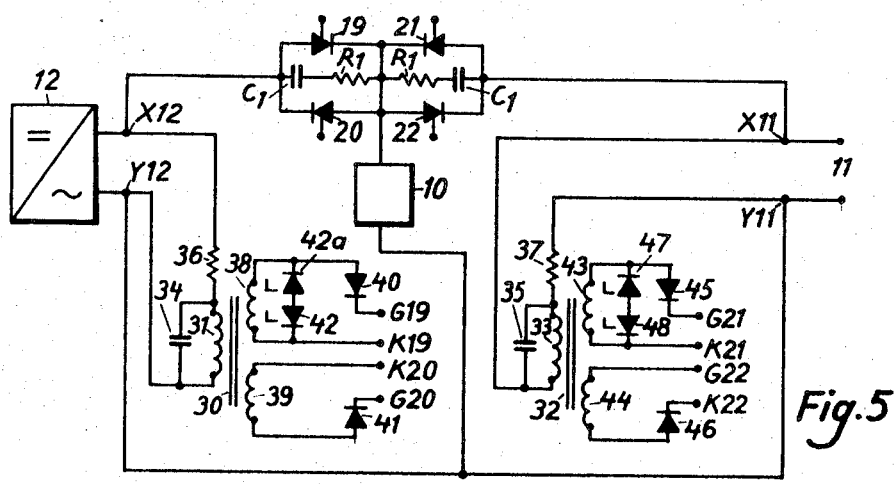
Figure 7:
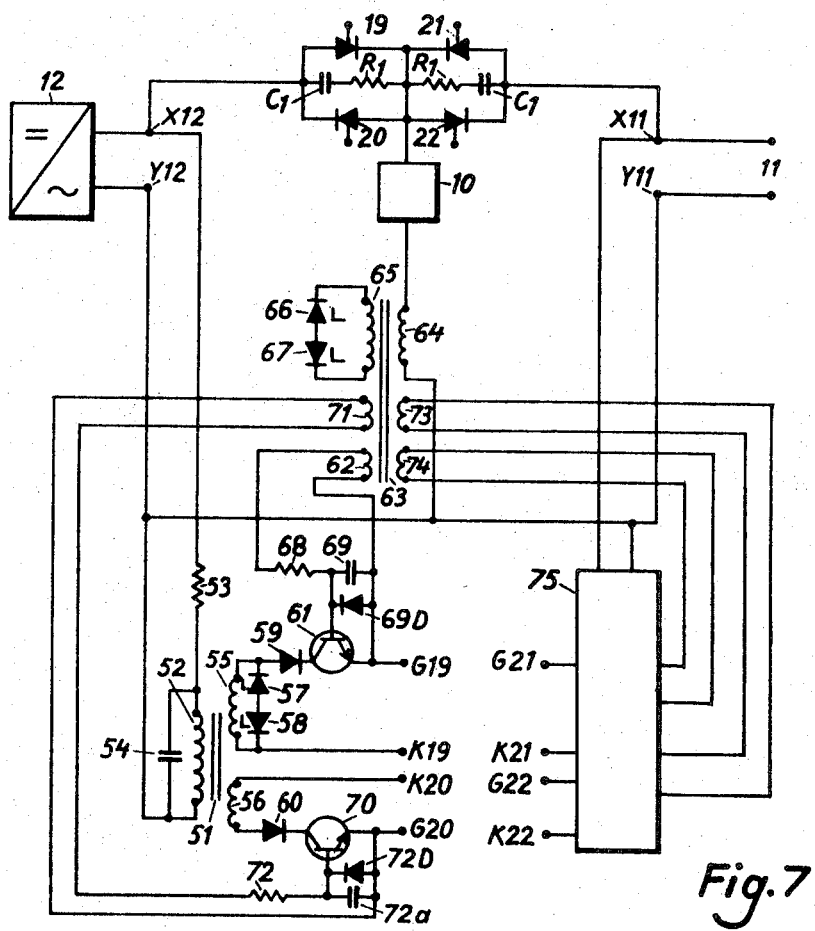
Figure 6:
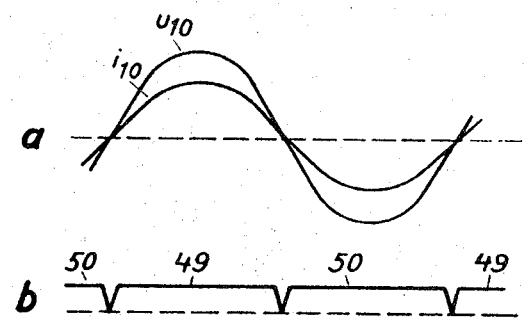
Figure 8:
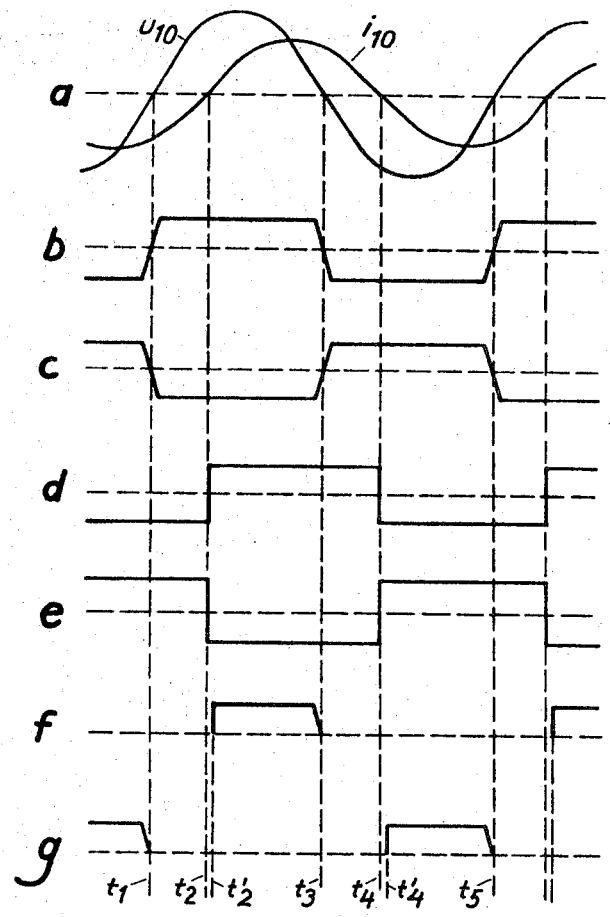
Figure 9:
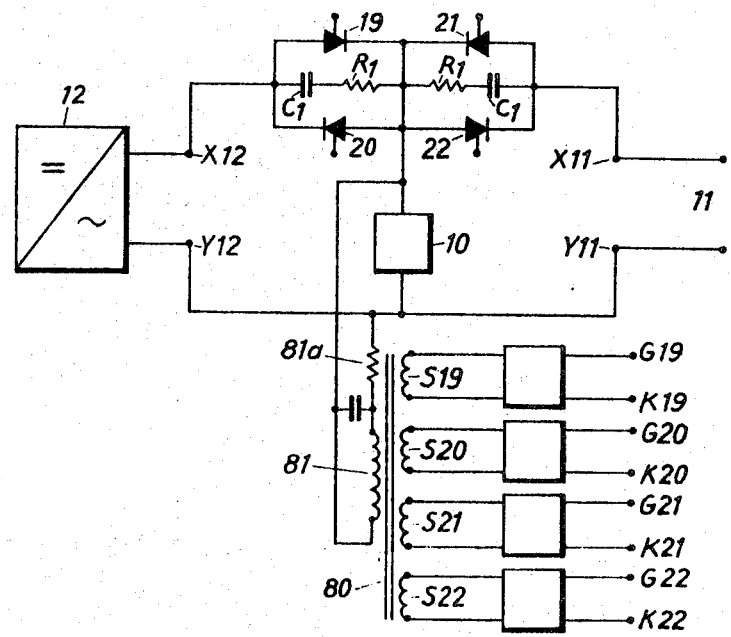
Figure 10:
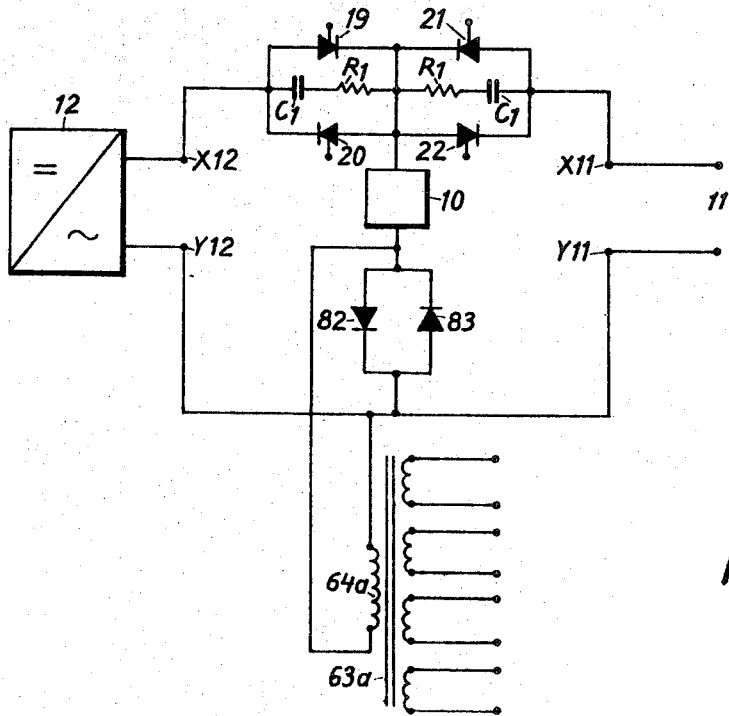

The invention will be described in the following with reference to the accompanying drawings in which FIG. 1 shows a simplified circuit diagram of an embodiment of the invention at which two current sources are present, FIG. 2 shows in the same way another embodiment, at which likewise two current sources are present, FIG. 3 shows a modification of the arrangement according to FIG. 2, FIG. 4 shows an arrangement according to the invention, similar to the arrangement according to FIG. 1, but suited for more than two current sources, FIG. 5 shows a simplified circuit diagram of a pulse generator, intended to be a part of an arrangement according to the invention, and in which the load mainly has a resistive impedance, FIG. 6 shows some waveforms of alternating voltages and alternating currents, for explaining the operation of the arrangement according to FIG. 5, FIG. 7 shows in similar manner a pulse generator, intended to be included in an arrangement according to the invention when the load has inductive impedance, FIG. 8 shows some waveforms of alternating voltages and alternating current for explaining the operation of the arrangement according to FIG. 7, FIG. 9 shows a modification of the arrangement according to FIG. 5 and FIG. 10 shows a modification of the arrangement according to FIG. 7.

In the arrangements shown in the drawing there is a load which in all cases is indicated by reference 10. For feeding this load there is an alternating current main which in all cases has been indicated by two poles 11 and moreover according to the FIGS. 1, 2, 3, 4, 5, 7 and 10 an inverter, intended to be fed from a D.C. current source. This arrangement is indicated by reference 12. At the arrangement according to FIG. 4 there are two such equipments indicated by reference 12A and 12B respectively.

The inverter 12 generates an alternating voltage, the frequency and the phase of which is equal to the alternating voltage of the mains 11.

The inverter 12 has two outputs for alternating current indicated by references X12 and Y12. Correspondingly the mains 11 is connected to two outputs indicated by references X11 and Y11.

Moreover there is a pair of thyristors for each alternating current source in the shown arrangements. The thyristors in each pair are connected in parallel with each other and have mutually different conducting directions. Each alternating current source is adapted to feed the load 10 in series with such a pair of thyristors.

For the alternating current source 11 (the mains) said thyristor pair is indicated by references 21 and 22 and for the alternating current source 12 (the inverter) the thyristor pair is indicated by references 19 and 20 (in FIG. 4 19A and 20A for the alternating current source 12A and 19B and 20B for the alternating current source 12B).

The operation of the arrangements shown in FIGS. 1, 2 and 3 is the following:

When X11 and X12 are positive and Y11 and Y12 negative the control electrodes of the thyristors 19 and 21 are supplied with control pulses, so that these thyristors are conducting. During these half-periods the thyristors 20 and 22 are non-conducting. If during such a half-period the voltage in the point X12 is higher than the voltage in the point X11 the current will flow from the inverter 12 through the load 10. No current will then flow from the mains 11. Owing to that each of the thyristors 19 and 21 are conducting only in one direction and that the thyristors 20 and 21 are blocked no equalizing current will flow from the inverter 12 to the mains 11. It is in the corresponding manner if a short-circuiting should arise in the mains 11. It is then only the inverter 12 which delivers current to the load 10 and the short-circuiting will not influence the output voltage of the inverter. If the potential of X11 instead should exceed the potential of X12 it is the mains 11 which will supply current to the load 10. No equalizing current will flow from the mains to the inverter 12. In this case it is the thyristor 19 which is blocked. Moreover the thyristors 20 and 22 are still non-conducting.

During the half-periods, when X11 and X12 are negative and Y11 and Y12 are positive the control electrodes of the thyristors 20 and 22 are supplied with such control voltages that these thyristors become conducting while the thyristors 19 and 21 are blocked.

In parallel with each thyristor pair a RC-circuit is connected consisting of a capacitor $C_1$ and a resistor $R_1$ in series connection. These have among other things the purpose to reduce the time derivative du/dt of the voltage. This derivative is during normal working completely riskless but upon a short-circuiting in one of the voltage sources 11 or 12 it can assume very high values and result in misfiring of the thyristors. If one assume, that X11 and X12 are positive and that X12 has higher voltage than X11, so that the inverter 12 delivers current to the load and that short-circuiting occurs in the mains 11, the thyristor 22 will suddenly be subject to a voltage across the occasionally blocked conducting direction which is equal to the momentary value of the voltage appearing across X12 and Y12. Such sudden voltage peaks are avoided by means of said RC-circuits.

By the arrangements described previously the current source which for the occasion has the highest momentary voltage is connected to the load in each moment. The arrangements protect in this manner the load against appearing voltage drop in the one or the other of the voltage sources but on the contrary not against a voltage increase. A good protection against transient overvoltages which frequently appear in the mains, but infrequently in inverters, constitute magnetic stabilizers which also act limiting on more slow variations and appearing distortions in the voltage of the mains.

In the FIGS. 2 and 3 two ways to use magnetic stabilizers are shown in connection with the arrangement according to FIG. 1. In the arrangement according to FIG. 2 a magnetic stabilizer 23 is connected across the mains 11, and therefore at this arrangement only the voltage of the mains is stabilized. In the arrangement according to FIG. 3 the magnetic stabilizer 23 is connected across the output voltage to the load 10, and therefore at this arrangement the voltage is stabilized which at the moment feeds the load. In the last mentioned case a more simple inverter 12 is used. Voltage regulation and conversion, if any, of the wave form from rectangle form to sinus form is attended to by the magnetic stabilizer.

In FIG. 4 an arrangement according to the invention is shown at which three voltage sources are used for feeding the load 10. These voltage sources are the mains 11 and the inverters 12A and 12B. Each current source is with one of its poles connected directly to the one terminal of the load 10 and with its second pole via a pair of thyristors 19A, 20A and 19B, 20B and 21, 22 to the second terminal of the load. The two thyristors for each current source are connected in parallel with each other but their conducting directions are mutually different. For each half-period when the output terminals X11, X12A and X12B of the current sources 11, 12A and 12B are positive the control electrodes of the thyristors 19A, 19B and 21 are supplied with voltage pulses, so that these thyristors become conducting in their conducting direction, while the thyristors 20A, 20B and 22 are non-conducting. For each half-period when the output terminals X11, X12A and X12B are negative the thyristors 20A, 20B and 22 will in a corresponding manner be conducting while the thyristors 19A, 19B and 21 are non-conducting. The last described arrangement has for the rest the same function as the arrangement according to FIG. 2. It is provided with such RC-circuits which are shown in FIGS. 1, 2 and 3 and can be completed with a magnetic stabilizer which is shown in FIG. 2 or FIG. 3.

In order to get the arrangements described in the previous to function in a correct manner it is essential that the thyristors included in the arrangements are supplied with control pulses with correct duration and in a correct sequence. A fundamental condition is that certain thyristors, for example the thyristor pair 19 and 21 reverts to its non-conducting condition before other thyristors, for example before the thyristor pair 20 and 22 becomes conducting.

When the load 10 has resistive impedance a relatively simple arrangement can be used for producing control pulses to the control electrodes of the thyristors. In FIG. 5 a circuit diagram is shown for such an arrangement applied to such a current supply arrangement which is described in the previous in connection with the FIGS. 1, 2 and 3.

The arrangement for producing control pulses includes on one hand a transformer 30 the primary winding 31 of which being connected to the output terminals X12 and Y12 for the current source 12 and on the other hand a transformer 32, the primary winding 33 of which being connected to the output terminals X11 and Y11 for the current source 11. The primary windings 31 and 33 can each be connected in parallel with a capacitor 34 and 35 respectively and eventually series connected with a resistor 36 and 37 respectively, the capacitance and resistance respectively of these elements being chosen so that the desired phase angle of the produced pulses is obtained.

The transformer 30 has two secondary windings 38 and 39 which each are connected to two output terminals, indicated by references G19 and K19 for the winding 38 and G20 and K20 for the winding 39. In series with each of the secondary windings there are two diodes 40 and 41 respectively which cause that only positive half-periods are allowed to pass to the terminals G19 and G20. The windings 38 and 39 have such winding directions, that every second half-period appears on the terminal G19 and intermediate half-periods on the terminal G20.

One of the windings of the transformer 30, for example the secondary winding 38, is connected to a voltage limiter, consisting of two zener diodes 42 and 42a which are connected in series and have mutually opposite conducting directions. These convert the pulses appearing across the output terminals G19 and K19 and G20 and K20 respectively to trapezoid-formed pulses which appears from FIG. 6. Owing to the strong inductive coupling between the secondary windings 38 and 39 the voltage limiting operation of the zener diodes 42 and 42a will mainly be equal for the two windings.

Also the transformer 32 has two secondary windings 43 and 44 and these are connected to one pair each of output terminals G21, K21 for the winding 43 and G22, K22 for the winding 44. In series with each of the secondary windings there is a diode 45 and 46 respectively. Across the secondary winding 43 a voltage limiter is connected which consists of two zener diodes 47 and 48. The secondary windings 43 and 44 with belonging connection element have a function which completely correspond to the function of the secondary windings 38 and 39 with belonging connecting element.

The output terminals G19 and K19 are through windings (not shown) connected to the control electrode and to the cathode respectively of the thyristor 19. In corresponding manner the output terminals G20 and K20 are connected to the control electrode of the thyristor 20. The output terminals G21 and K21 are connected to said electrodes of the thyristor 21 and the output terminals G22 and K22 to corresponding electrodes of the thyristor 22.

In FIG. 6 examples of pulses are shown which are produced by means of the arrangement shown in FIG. 5. The pulses are themselves equal. The control pulses which are applied to the control electrodes of the thyristors 19 and 21 when the terminals X11 and X12 are positive are indicated by reference 49. During this time the control electrodes of the thyristors 20 and 22 obtain no control pulses and therefore these thyristors are non-conducting. The control pulses, which are applied to the control electrodes of the thyristors 20 and 22 when the terminals X11 and X12 are negative are indicated by reference 50. During this time the control electrodes of the thyristors 19 and 21 obtain no control pulses, and therefore they are non-conducting.

As already mentioned, the arrangement according to FIG. 5 can only be used if the load 10 has resistive impedance, i.e., if the current $i_{k0}$ through the load is in phase with the voltage $u_{10}$ across the load in the manner which is shown in FIG. 6a.

In FIG. 7 an arrangement is schematically shown which can be used if the load 10 has inductive impedance. The arrangement includes a transformer 51, the primary winding 52 of which is connected to the output terminals X12 and Y12 of the voltage source 12, to which the arrangement belongs. A resistor 53 is in series connected with the primary winding 51 and a capacitor 54 is connected in parallel with the same. These elements serve the same purpose as the elements 34 and 36 in the arrangement according to FIG. 5.

The transformer 51 has two secondary windings 55 and 56 with each one pair of output terminals G19 and K19 and G20 and K20, respectively. As at the arrangement according to FIG. 5, these are presumed to be connected to the control electrode and to the cathode respectively of the two thyristors 19 and 20. As at the arrangement according to FIG. 5 the secondary winding 55 is connected in parallel with a voltage limiter consisting of two zener diodes 57 and 58. Furthermore a diode 59 is connected in series with the secondary winding 55 and another diode 60 is connected in series with the secondary winding 56. These contribute to prevent negative half-periodes from appearing across the terminals G19 and G20 so that these terminals can only become positive compared with the terminals K19 and K20.

In series with the connection line between the secondary winding 55 and the terminal G19 the collector-emitter distance of a transistor 61 is inserted. The base electrode of this transistor is connected to the one side of a secondary winding 62 belonging to a transformer 63, the primary winding 64 of which is connected in series with the load 10. The other side of the secondary winding 62 is connected to the emitter of the transistor 61. In series with the base electrode of the transistor 61 a resistor 68 is inserted and a capacitor 69 is connected between the base electrode and the emitter. In parallel with the capacitor 69 a diode 69D is connected the purpose of which is to limit the negative basic-emitter-voltage, which is brought to the transistor 61 to the value which corresponds to the threshold value (about 0,8 volt) of the diode. The transformer 63 has a further number of secondary windings, of which one, 65, is connected to a voltage limiter which includes two zener diodes 66 and 67. This voltage limiter has the purpose to convert the output voltage delivered by the transformer 65 from sinus form to generally a square wave form.

In corresponding manner a transistor 70 is inserted between the secondary winding 56 and the output terminal G20. The base electrode of the transistor is connected to the one side of another secondary winding of the transformer 63 which is indicated by reference 71. The second side of the winding is connected to the emitter of transistor 70. In series with the base electrode to the transistor 70 a resistor 72 is inserted. Furthermore a capacitor 72a and a diode 72D are connected between the base electrode and the emitter of the transistor. These elements have the corresponding function as the elements 69 and 69D have for the transistor 61.

It is now assumed that the arrangement according to FIG. 7 has one further transformer similar the transformer 5, and that the primary winding of this further transformer is connected to the terminals X11, Y11. The two secondary windings of this transformer are connected to output terminals G21, K21, G22 and K22. In series with the connections to G21 and G22 transistors are inserted which correspond to the transistors 61 and 70. The base electrodes of these transistors are supplied with control voltage from the secondary windings 73 and 74 from the transformer 63. Moreover there are voltage limiting and blocking diodes corresponding to the diodes 57, 58, 59 and 60. Whole of this further control arrangement is shown in the drawing in the form of a block 75.

In FIG. 8 some curves are illustrated for clarifying the operation of the arrangement according to FIG. 7. The alternating voltage across the load 10 is indicated by reference $u_{10}$ and the current through the load is indicated by reference $i_{10}$. Owing to the fact that the load has inductive impedance the current $i_{10}$ is out of phase after the voltage $u_{10}$. If the thyristors should be supplied with control pulses, which had the same phase position as the voltage $u_{10}$, which should be the condition if a control arrangement according to FIG. 5 is used, this would involve, that the thyristors 19 and 21 were made conducting at the time $t_1$ and would become conducting until the time $t_4$. The thyristors 20 and 22 should then be made conducting at the time $t_3$ and become conducting until the current curve $i_{10}$ again intersects the zero-line. This means, that during the time intervals $t_1 - t_2$, $t_3 - t_4$ and so on all thyristors would be able to be conducting at the same time, which would involve that if for example X12 during the time interval $t_3 - t_4$ should be higher potential than X11 (i.e., less negative potential than X11), then a high transient current would flow from X12 through the thyristors 19 and 22 to X11. This in turn would imply a not desirable load of the inverter 12, and a influence in the voltage across the load 10. A similar phenomenon would arise if the control pulses had the same phase position as the current $i_{10}$ i.e., from $t_2$ to $t_4$ and from $t_4$ to the next zero-passage of the current curve. In order to avoid equalizing currents between the inverter and the mains the arrangement produces control pulses according to FIG. 7 only during the part of each half-period, when the voltage $u_{10}$ as well as the current $i_{10}$ has the same sign i.e., from $t_2$ to $t_3$ and from $t_4$ to $t_5$ and so on. For this purpose the control arrangement is adapted to consider the phase angle of the voltage curve $u_{10}$ as well as that of the current curve $i_{10}$. The transformer 51 is adapted to produce pulses which are delivered in the direction towards the terminals G19 and G20 at the beginning of each half-period at the voltage curve. These pulses can, however, not reach the terminals in question owing to the fact that the transistors 61 and 70 are non-conducting. From the transformer 63 control pulses are applied to the base electrodes of the transistors 61 and 70, these transistors thus being transferred to their conducting condition. These control pulses generally have the same phase position as the current through the load 10.

In FIG. 8b the curve for the voltage is shown which appears across the secondary winding 55 of the transformer 51 and in FIG. 8d the curve for the voltage is shown which appears across the secondary winding 62 of the transformer 63. A pulse appears on the terminal G19 only during the time, when the curve 8b as well as the curve 8d has positive values. The pulse will therefore start at the time $t_2$ and will durate until the time $t_3$. This pulse is shown in FIG. 8f.

In corresponding manner the curve for the voltage is shown in FIG. 8, which appears in the secondary winding 56 of the transformer 51. This curve is indicated by 8c. In FIG. 8e the voltage across the secondary winding 71 of the transformer 63 is shown. A pulse appears on the terminal G20 only during the time, when the curve 8c as well as the curve 8e has positive values. This pulse is shown in FIG. 8g.

In order to secure, that the pulses 8f and 8g do not start until the last conducting thyristors have become non-conducting the starting point of the pulse should be delayed for some time compared with the times $t_2$, $t_4$ and so on. The pulses are therefore permitted to start at the time $t_2'$ and $t_4'$ respectively and so on which are a little later than the times $t_2$ and $t_4$ respectively. The time delay between these different points should amount to about 100 $\mu$s. This is achieved by means of suitable choice of the capacitors 69 and 72a and the resistors 68 and 72.

The control arrangements described until now produce control pulses which are of continuous duration the whole time interval, when the thyristor, to which the pulse is applied, is conducting. However, the pulses can instead consist of a train of short pulses which durate during the same time. It is necessary that the control pulse or the control pulse train durate during all this time in order that the load current whenever during each such time interval shall be able to commutate from a thyristor pair for example the thyristor pair 19, 20 to the other thyristor pair, for example the thyristor pair 21, 22 provided that the voltage across the one voltage source, for example the inverter 12 would sink or disappear.

The control arrangements described in connection with the FIGS. 5 and 7 are only examples of how the control arrangements for the purpose in question can be constructed. The control arrangements could thus be constructed in a number of other manners. Such control arrangements can also appear in connection with the arrangements which are described in connection with the FIGS. 1, 2, 3 and 4 without the scope of the invention is exceeded.

Instead of arranging a control transformer for each voltage source, only one control transformer can be arranged with only one primary winding and a secondary winding for each thyristor which is to be controlled. In FIG. 9 is shown how such an arrangement can be connected. At the arrangement according to this figure a control transformer 80 exists which has only one primary winding 81 connected in parallel with the load 10. The transformer 80 has four secondary windings S19, S20, S21 and S22, arranged that via such connection elements which are shown for example in connection with FIG. 7 feed output terminals G19, K19, G20, K20, G21, K21, G22 and K22 which are presumed to be connected to the electrodes provided for control of the thyristors 19, 20, 21 and 22.

In order to get the control arrangements shown in the FIGS. 7 and 9 to operate it is required that current flows through the load 10. An initial current which allows the control arrangements to start, is obtained owing to the RC-circuits $R_1$, $C_1$, $R_2$, $C_2$, which are connected in parallel with the thyristor pairs arranged for the different voltage sources. These RC-circuits allow such a great current to flow through the load that the control arrangement can start, the thyristors starting to conduct.

In FIG. 7 the transformer 63 is shown when constructed as a current transformer, the primary winding 64 of which being connected in series wih the load 10. As an alternative to this connection manner an impedance can be connected in series with the load 10 and connect the primary winding of a voltage transformer through this impedance. In FIG. 10 a primary winding of a voltage transformer 63a is shown to be connected through a connection arrangement serving as an impedance consisting of two diodes 82, 83 in anti-parallel-connection. These diodes have a threshold value in the conducting direction of about 0,8 volt, and therefore a nearly square wave formed voltage of about 0,8 volt will appear across this impedance when flowed through by an alternating current. This voltage is up-transformed by the transformer 63a so that suitable voltage values are obtained across its secondary windings. At this arrangement no such voltage limiting diodes are required as the diodes 66, 67 in FIG. 7. With a voltage transformer according to FIG. 10 it is easier to avoid not desirable phase shift between the primary- and secondary voltage of the transformer than when a current transformer is used.

We claim:

1. An arrangement for uninterruptable power supply from two or more A.C. power sources giving output voltages of mutually equal frequency and in the main of similar phase relation comprising for each of said A.C power sources a pair of controlled rectifier elements connected in antiparallel with each other, said pair being on one hand connected to one of said power sources and on the other hand to a load, controlling means for supplying to the control electrode of each of said rectifiers control pulses with a repetition frequency which is equal to the frequency of the output voltage from said A.C. power sources, said control pulses being delivered simultaneously to those rectifiers in each of said pairs which have the same pole connected to one terminal of the power source, respectively, the first element in said pair being supplied with control pulses during a certain part of a half-period of said output voltage and the second element in said pair being supplied with control pulses during the corresponding part of the next following half-period of said output voltage.

2. An arrangement as claimed in claim 1, wherein at resistive load the control pulses are supplied during the whole half-period of said alternating voltage while at resistive-inductive load the control pulses are supplied only during the part of the half-period when both the voltage across and the current through the load has the same polarity, whereby at voltage reduction or short-circuiting in one of said voltage sources the voltage across the load remains uninfluenced and the power supply occurs from other voltage sources to the load, while no equalizing currents between the voltage sources arise.

3. An arrangement as claimed in claim 1, wherein across each pair of said rectifier elements which with unlike poles are connected to the same alternating voltage source 11, 12 a series connection of a capacitor C1 and a resistor R1 is connected in parallel, in purpose to make the start of the arrangement easier and to prevent the rise of rapid voltage changes across the rectifiers.

4. An arrangement as claimed in claim 1, wherein an arrangement for generation of control pulses to said controlled rectifier elements includes a first transformer 30, 51, 80 with partly a primary winding 31, 52, 81 which in series with one or several impedances 36, 53, 81a are connected to the poles of one or several of said power sources 11, 12 and partly a number of secondary windings 38, 39, 55, 56, S19–S22, from which voltages are received, which are mutually 180° out of phase and partly a number of rectifier elements 40, 41, 59, 60 being connected to each one of the voltage outputs with mutually equal poles, the opposite poles of the rectifier elements being connected to the control electrodes of said controlled rectifier elements 19–22, which periodically connect the voltage source 11, 12 in question to the load 10.

5. An arrangement as claimed in claim 4, wherein a voltage limiter consisting of two diodes 42, 42a, 57, 58 connected together with opposite conducting directions, being arranged in connection to the transformer, in purpose to transform the pulses to square wave form.

6. An arrangement as claimed in claim 4, wherein controlled electronic rectifiers, for example transistors 61, 70 are arranged in series with the terminals for the control voltage pulses and that the control electrodes of said rectifiers are supplied with a control voltage from another transformer 63, 63a, the primary winding 64, 64a of which is fed in series with the load 10 and which is arranged to give control pulses to the electronic rectifiers 61, 70 so that these are conducting only during such a long time of each half-period as the voltage impressed on the load and the current flowing through said load having the same polarity.

7. An arrangement as claimed in claim 4, wherein the primary winding of said first transformer 30, 51, 80 is connected in parallel with the load 10.

8. An arrangement as claimed in claim 4, wherein the primary winding of said second transformer 63, 63a is connected in parallel with a connection element 82, 83 which is inserted in series with the load 10.

9. An arrangement as claimed in claim 8, wherein said connection element consists of two diodes 82, 83 connected in parallel with each other and with mutually different conducting direction and with in the main mutually equal threshold values.

* * * * *